United States Patent
Nagatsuka

(10) Patent No.: US 10,112,304 B2
(45) Date of Patent: Oct. 30, 2018

(54) ROBOT PROGRAMMING APPARATUS FOR TEACHING MACHINING OPERATION TO ROBOT

(71) Applicant: FANUC Corporation, Yamanashi (JP)

(72) Inventor: Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 23 days.

(21) Appl. No.: 14/948,315

(22) Filed: Nov. 21, 2015

(65) Prior Publication Data

US 2016/0151913 A1 Jun. 2, 2016

(30) Foreign Application Priority Data

Nov. 28, 2014 (JP) .................... 2014-242543

(51) Int. Cl.
*B25J 11/00* (2006.01)
*B25J 9/16* (2006.01)

(52) U.S. Cl.
CPC ........... *B25J 11/005* (2013.01); *B25J 9/1664* (2013.01); *Y10S 901/02* (2013.01)

(58) Field of Classification Search
CPC .... B25J 9/1671; B25J 9/1664; B25J 19/4097; B25J 19/4061
See application file for complete search history.

(56) References Cited

U.S. PATENT DOCUMENTS

| 5,157,315 | A | * | 10/1992 | Miyake | G05B 19/4086 318/568.11 |
| 5,610,842 | A | * | 3/1997 | Seki | G05B 19/4069 345/473 |
| 5,895,311 | A | * | 4/1999 | Shiotani | B23H 1/00 451/11 |
| 6,956,567 | B2 | * | 10/2005 | Sinn | G06T 15/00 345/419 |
| 7,494,305 | B2 | * | 2/2009 | Riall | B23C 3/16 409/132 |
| 8,538,574 | B2 | * | 9/2013 | Hahn | G05B 19/40937 700/159 |
| 9,573,202 | B2 | * | 2/2017 | Yasukochi | B23Q 15/007 |
| 2013/0116822 | A1 | * | 5/2013 | Atohira | G05B 19/4097 700/255 |

(Continued)

FOREIGN PATENT DOCUMENTS

| CN | 101058183 A | 10/2007 |
| DE | 602006000648 T2 | 3/2009 |
| DE | 102012021374 A1 | 5/2013 |

(Continued)

*Primary Examiner* — Timothy R Waggoner
(74) *Attorney, Agent, or Firm* — Hauptman Ham, LLP

(57) ABSTRACT

According to a robot programming apparatus, a position and a posture of a tool is determined based on a machining path formed by projecting an operation pattern onto a workpiece model. The robot programming apparatus includes a determination unit configured to determine whether or not a workpiece and the tool interfere with each other at any point, except for a machining point of the tool, and a position and posture correction unit configured to correct at least one of the position and the posture of the tool so that the workpiece and the tool do not interfere with each other at any point, except for the machining point of the tool.

9 Claims, 11 Drawing Sheets

(56) References Cited

U.S. PATENT DOCUMENTS

2013/0325177 A1* 12/2013 Atohira .................. B25J 9/1671
 700/245

FOREIGN PATENT DOCUMENTS

| DE | 102013008755 A1 | 12/2013 |
|----|-----------------|---------|
| JP | 63-94152 A | 4/1988 |
| JP | 5-289722 A | 11/1993 |
| JP | 6-59720 A | 3/1994 |
| JP | 6-218684 A | 8/1994 |
| JP | 7-100755 A | 4/1995 |
| JP | 7-168617 A | 7/1995 |
| JP | 9-244722 A | 9/1997 |
| JP | 10-20920 A | 1/1998 |
| JP | 2001-60108 A | 3/2001 |
| JP | 2013-99815 A | 5/2013 |
| JP | 2013-248677 A | 12/2013 |

* cited by examiner

ROBOT PROGRAMMING APPARATUS FOR TEACHING MACHINING OPERATION TO ROBOT

RELATED APPLICATIONS

The present application claims priority to Japanese Application Number 2014-242543, filed Nov. 28, 2014, the disclosure of which is hereby incorporated by reference herein in its entirety.

BACKGROUND OF THE INVENTION

1. Field of the Invention

The present invention relates to a robot programming apparatus used for teaching a robot a required operation.

2. Description of the Related Art

In a known robot system, a robot holding a tool operates to perform predetermined machining on a workpiece. In such a robot system, a robot needs to be taught a certain operation, but a process of teaching a robot is generally complicated. Japanese Laid-open Patent Publications No. 6-059720 and No. 2013-248677 disclose techniques for creating a machining program offline.

Japanese Laid-open Patent Publication No. 6-059720 discloses a robot program creation method for creating a deburring program used to cause a robot equipped with a deburring tool to execute deburring on a product. According to this related technique, a linear element and a circular arc element included in a graphic are extracted from graphic data of an object created by a computer aided design (CAD), and a posture of a tool is calculated according to an angle formed between an end point of the linear element or a midpoint of the circular arc element and a plane of the graphic.

Japanese Laid-open Patent Publication No. 2013-248677 discloses a robot programming apparatus which creates a robot program for machining a workpiece using a robot equipped with a tool. According to this related technique, a certain operational pattern of the tool is projected onto a surface of a workpiece model in a virtual space to create a machining path, and also a position and a eposture of a tool are determined based on the machining path and a direction of a line extending normally relative to the surface of the workpiece model.

The above-described related techniques have advantages in that a robot program can be automatically created. However, when a program created offline is actually executed, a tool may possibly interfere with a workpiece. If this is the case, the program needs to be corrected, and therefore work efficiency of a teaching process may be decreased.

Therefore, there is a need for a robot programming apparatus which can create a robot program avoiding interference between a tool and a workpiece.

SUMMARY OF THE INVENTION

According to a first aspect of the present invention, there is provided a robot programming apparatus configured to create a robot program for operating a robot equipped with a tool to execute machining of a workpiece arranged in a work space, the robot programming apparatus comprising: a virtual space creation unit configured to create a virtual space which three-dimensionally represent the work space; a model arrangement unit configured to arrange a workpiece model, a robot model, and a tool model which three-dimensionally represent the workpiece, the robot, and the tool in the virtual space, respectively; a projection target arrangement unit configured to arrange in the virtual space a projection target on which an operation pattern of the tool for machining the workpiece is provided; a machining path creation unit configured to project the operation pattern onto at least one surface of the workpiece model and create a machining path through which a machining point of the tool passes for machining the workpiece; a position and posture determination unit configured to determine a position and a posture of the tool for machining the workpiece based on a direction of a normal line to the at least one surface of the workpiece model and on the machining path; a determination unit configured to determine whether or not the workpiece and the tool interfere with each other at any point, except for the machining point of the tool, based on the position and the posture of the tool determined by the position and posture determination unit; and a position and posture correction unit configured to, when the determination unit determines that interference occurs, correct at least one of the position and the posture of the tool so that the workpiece and the tool do not interfere with each other at any point, except for the machining point of the tool.

According to a second aspect of the present invention, in the robot programming apparatus according to the first aspect, the position and posture correction unit is configured to change at least one of the position and the posture of the tool by correcting a teaching content for the robot.

According to a third aspect of the present invention, in the robot programming apparatus according to the first aspect, the position and posture correction unit is configured to change at least one of a position and a posture of the tool by changing a coordinate system defined in association with the tool.

According to a fourth aspect of the present invention, in the robot programming apparatus according to any one of the first to third aspects, the machining point of the tool is set in advance.

According to a fifth aspect of the present invention, in the robot programming apparatus according to any one of the first to fourth aspects, the machining path creation unit further comprises: a vertex identification unit configured to, when the operation pattern is projected onto the at least one surface of the workpiece model, identify a vertex of the operation pattern which is not project onto the at least one surface; and a vertex replacement unit configured to replace the vertex of the operation pattern identified by the vertex identification unit with a point which is on the at least one surface of the workpiece model and closest to the vertex.

According to a sixth aspect of the present invention, the robot programming apparatus according to any one of the first to fifth aspects, further comprises: an operation pattern storage unit configured to store a plurality of different operation patterns of the tool for machining the workpiece; and an operation pattern selection unit configured to select an operation pattern provided on the projection target from the plurality of different operation patterns.

These and other objects, features and advantages of the present invention will become more apparent in light of the detailed description of exemplary embodiments thereof as illustrated in the drawings.

DETAILED DESCRIPTION

Figure 1:
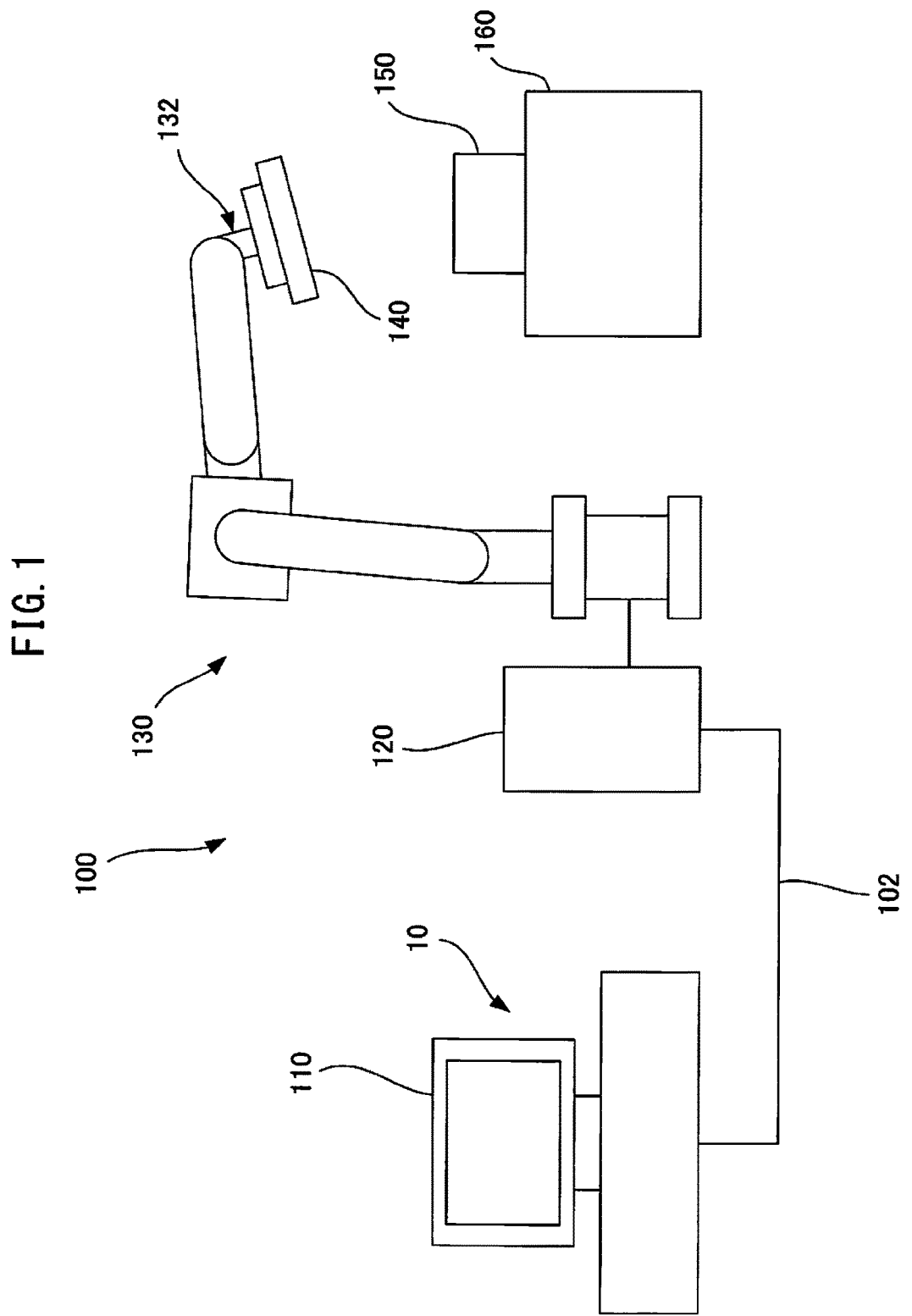
FIG. 1 illustrates an exemplary configuration of a robot system.

The embodiments of the present invention will be described below with reference to the accompanying drawings. Scales of illustrated components may be changed as necessary in order to facilitate understanding of the present invention. Same or corresponding components are denoted by the same reference numerals.

FIG. 1 illustrates an exemplary configuration of a robot system to which the present invention can be applied. A robot system 100 includes a robot 130, a robot control apparatus 120 which controls the robot 130, and a robot programming apparatus 10 which creates offline a robot program for causing the robot 130 to execute a certain operation.

The robot 130 is, for example, a vertical articulated robot and configured to hold a tool 140 on a wrist 132 situated at a tip end of an arm. The tool 140 is, for example, a cutter, a grinder, or a drill, but not particularly limited. The robot 130 is configured to change a position and a posture relative to a workpiece 150 arranged in a work space of the robot 130, so that the tool 140 and the workpiece 150 can move relative to each other. In the illustrated exemplary configuration, the workpiece 150 is placed on a table 160, but the present invention is not limited to such a specific example.

The robot control apparatus 120 outputs a control command to a servomotor (not illustrated) which drives a joint axis of the robot 130, according to a predetermined robot program. The robot control apparatus 120 is connected to the robot programming apparatus 10 via a known communication means, such as a communication cable 102, so that the robot control apparatus 120 and the robot programming apparatus 10 can transmit and receive signals and data to and from each other.

The robot programming apparatus 10 is a digital computer has a known hardware configuration including a central processing unit (CPU), a read-only memory (ROM), a random access memory (RAM), and the like. The robot programming apparatus 10 is connected to a display apparatus 110 via a known interface and configured to visually display a calculation result executed offline.

The robot programming apparatus 10 is used to virtually operate the robot 130 in a virtual space and to create and edit a robot program based on the result of virtual operation. For example, the robot programming apparatus 10 is used to create a robot program for executing machining on a workpiece 150 arranged in a work space using the robot 130 equipped with the tool 140.

Figure 2:
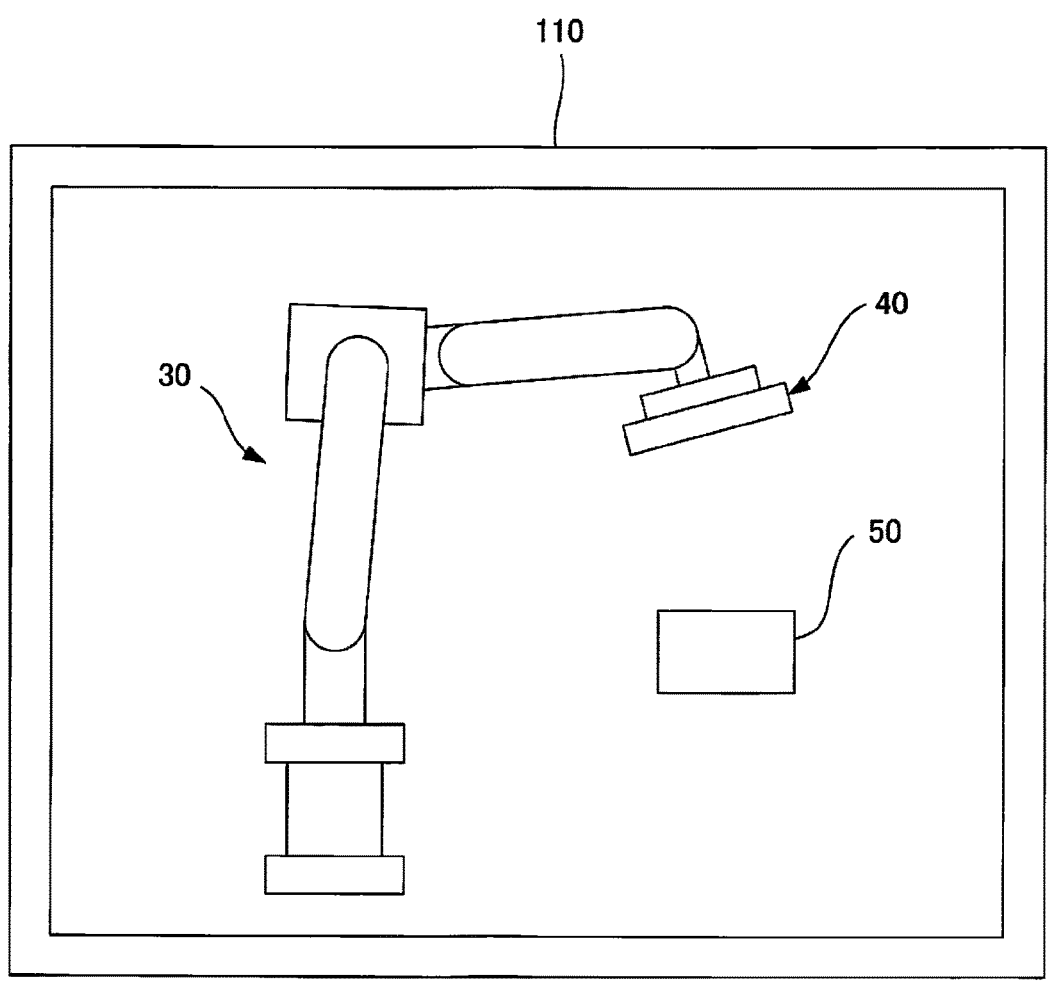
FIG. 2 illustrates an exemplary display by a display apparatus.

FIG. 2 illustrates an exemplary display by the display apparatus 110 used together with the robot programming apparatus 10. FIG. 2 illustrates a robot model 30, a tool model 40, and a workpiece model 50 in three dimensions in a virtual space, which represent the robot 130, the tool 140, and the workpiece 150 illustrated in FIG. 1, respectively. In FIG. 2, only a two-dimensional image is illustrated for simplification. However, an operator can freely change a viewpoint by operating a known input device, such as a mouse and a keyboard. Accordingly, the operator can visually check a positional relationship of each component in a three-dimensional space.

Figure 3:
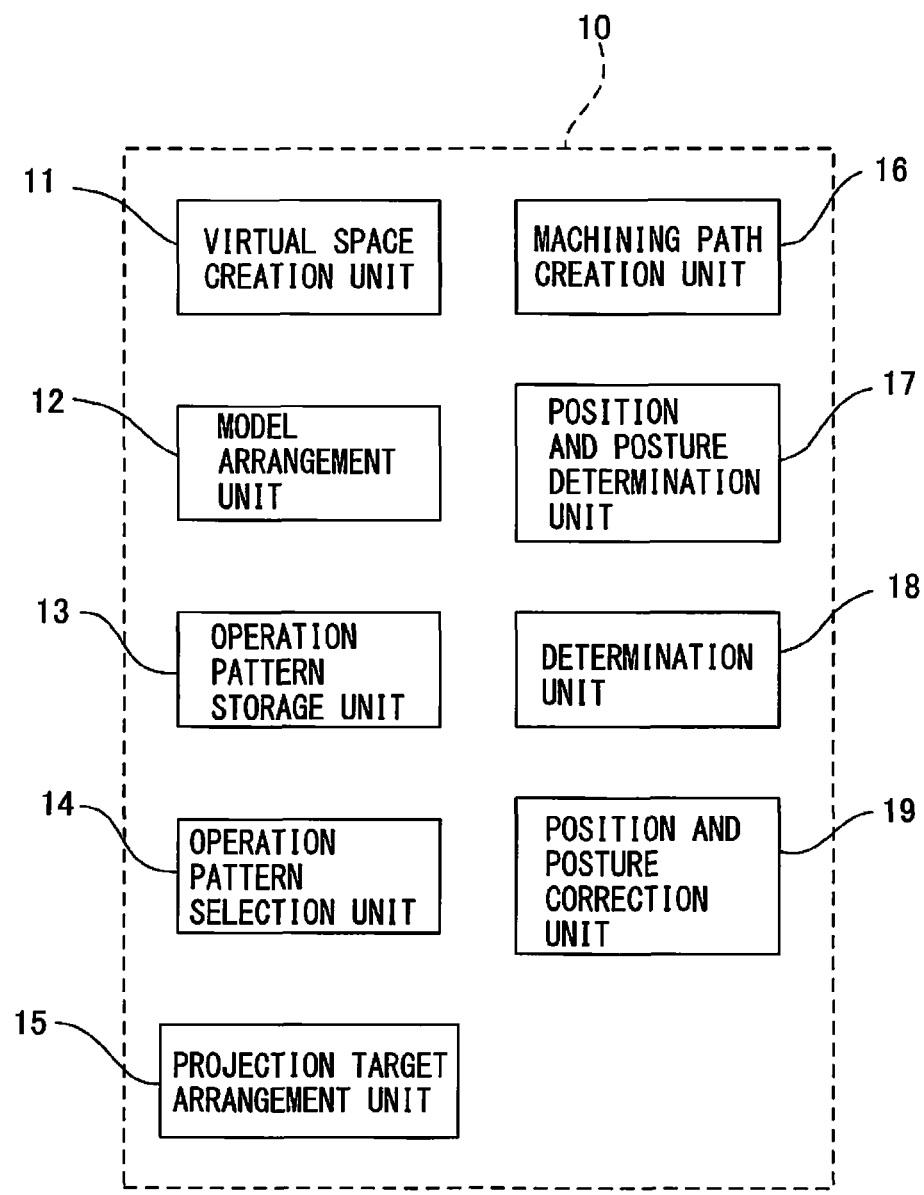
FIG. 3 is a functional block diagram of a robot programming apparatus.

FIG. 3 is a functional block diagram of a robot programming apparatus 10 according to one embodiment. The robot programming apparatus 10 includes a virtual space creation unit 11, a model arrangement unit 12, an operation pattern storage unit 13, an operation pattern selection unit 14, a projection target arrangement unit 15, a machining path creation unit 16, a position and posture determination unit 17, a determination unit 18, and a position and posture correction unit 19.

The virtual space creation unit 11 has a function of creating a virtual space which three-dimensionally represents a work space of the robot 130. The virtual space created by the virtual space creation unit 11 is displayed on a screen of the display apparatus 110.

The model arrangement unit 12 has a function of arranging a model which three-dimensionally represents in a virtual space a component to be considered when a robot program is created. A model of each component is created in advance based on, for example, CAD data and stored in the ROM of the robot programming apparatus 10. According to one embodiment, the robot model 30, the tool model 40, and the workpiece model 50 are arranged to correspond to a positional relationship of each other in an actual work space (see FIG. 2). In the case where an obstacle around the workpiece 150 or the robot 130 needs to be considered as well, the model arrangement unit 12 also arranges in the virtual space an additional model corresponding to the obstacle.

Figure 6:
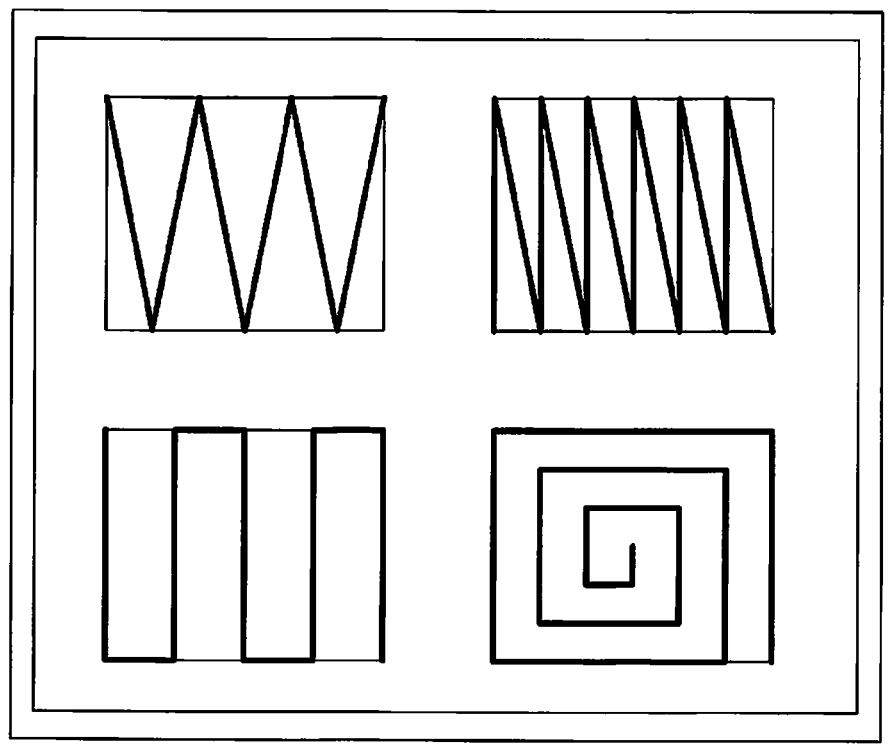
FIG. 6 illustrates examples of operation patterns.

The operation pattern storage unit 13 has a function of storing a plurality of different operation patterns of the tool 140 when machining the workpiece 150. FIG. 6 illustrates several examples of applicable operation patterns. As illustrated, operation patterns include V-shaped, U-shaped, N-shaped, and spiral patterns, however, the pattern is not limited to them.

The operation pattern selection unit 14 has a function of selecting an operation pattern to be formed on a projection target described below from the plurality of different operation patterns stored in the operation pattern storage unit 13.

The projection target arrangement unit 15 has a function of arranging, in a virtual space, a projection target having a surface on which the operation pattern selected by the operation pattern selection unit 14 is provided. The shape and dimensions of the projection target are stored in advance in the ROM of the robot programming apparatus 10.

The machining path creation unit 16 has a function of projecting the operation pattern provided on the projection target onto the workpiece model 50 and creating a machining path through which a machining point of the tool 140 passes.

The position and posture determination unit 17 has a function of determining a position and a posture of the tool 140 when the workpiece 150 is machined, based on a direction of a normal line to the surface of the workpiece model 50 and the machining path created by the machining path creation unit 16.

The determination unit 18 has a function of determining whether or not the workpiece 150 and the tool 140 interfere with each other at any point, except for the machining point of the tool 140, based on the position and the posture of the tool 140 determined by the position and posture determination unit 17.

The position and posture correction unit 19 has a function of correcting, when the determination unit 18 determines that interference occurs, at least one of the position and the posture of the tool 140 so that the workpiece 150 and the tool 140 do not interfere with each other at any point, except for the machining point of the tool 140.

Figure 4:
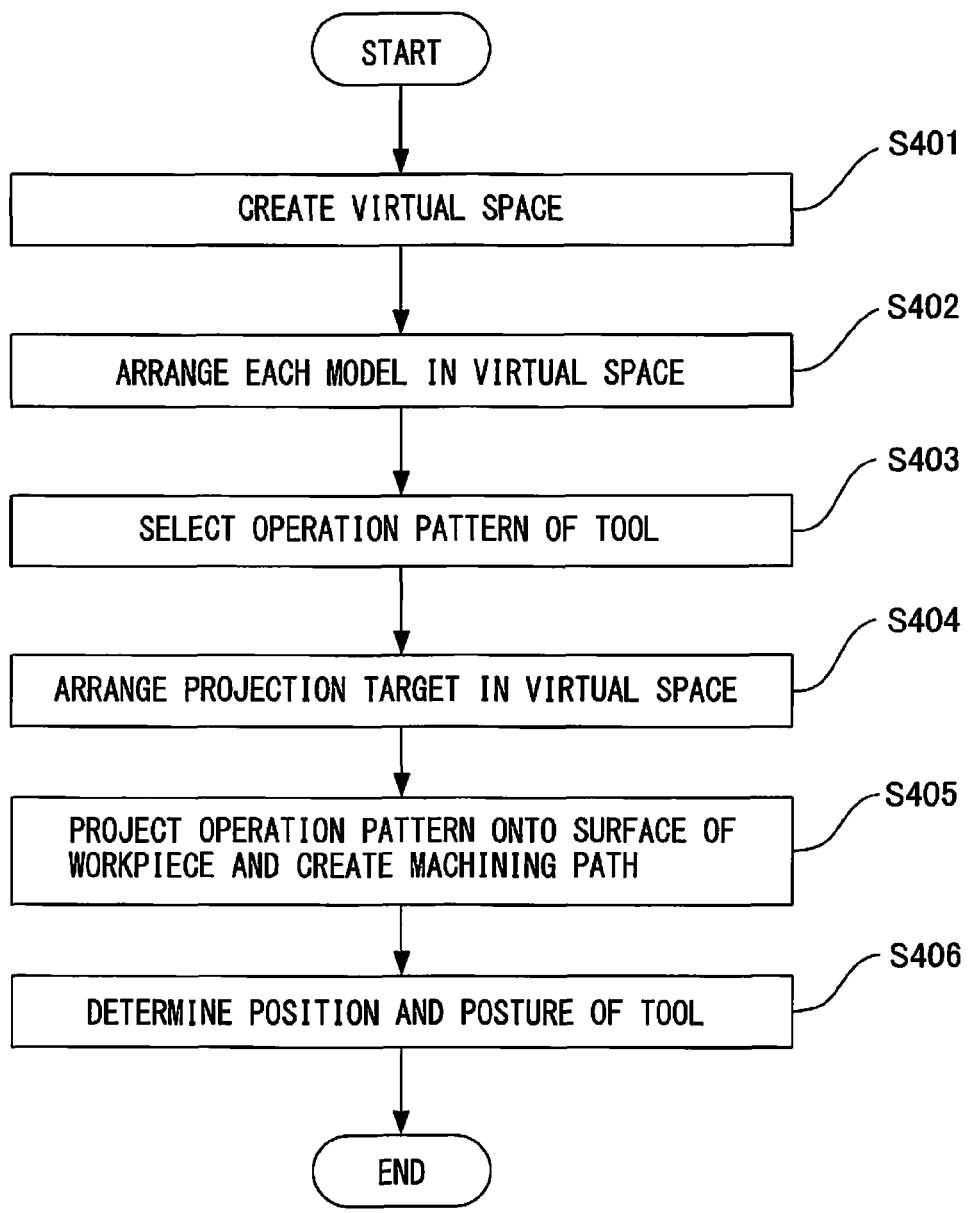
FIG. 4 is a flowchart illustrating processes for creating a robot program according to one embodiment.
Figure 5:
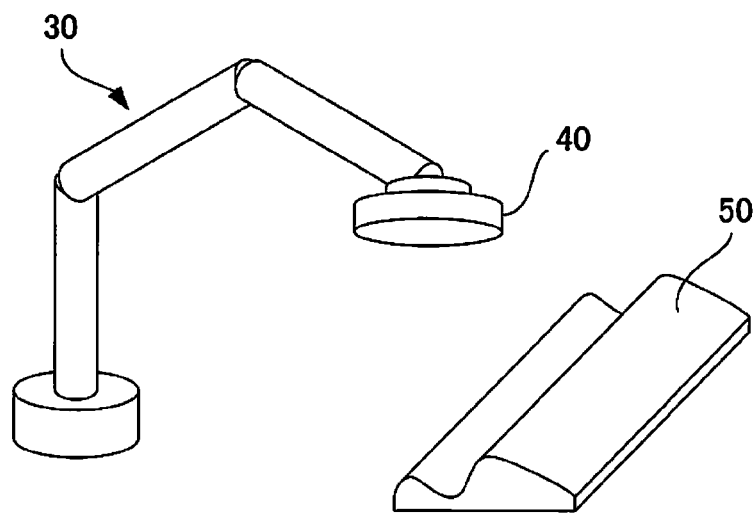
FIG. 5 illustrates a robot model, a tool model, and a workpiece model arranged in a virtual space.

FIG. 4 is a flowchart illustrating processes executed by the robot programming apparatus 10 according to one embodiment. In step S401, the virtual space creation unit 11 creates a virtual space which three-dimensionally represents a work space of the robot 130. In step S402, the model arrangement unit 12 arranges a robot model 30, a tool model 40, and a workpiece model 50 in the virtual space as illustrated in FIG. 5. Arrangement of each model corresponds to a positional relationship of each component in an actual work space.

Figure 7A:
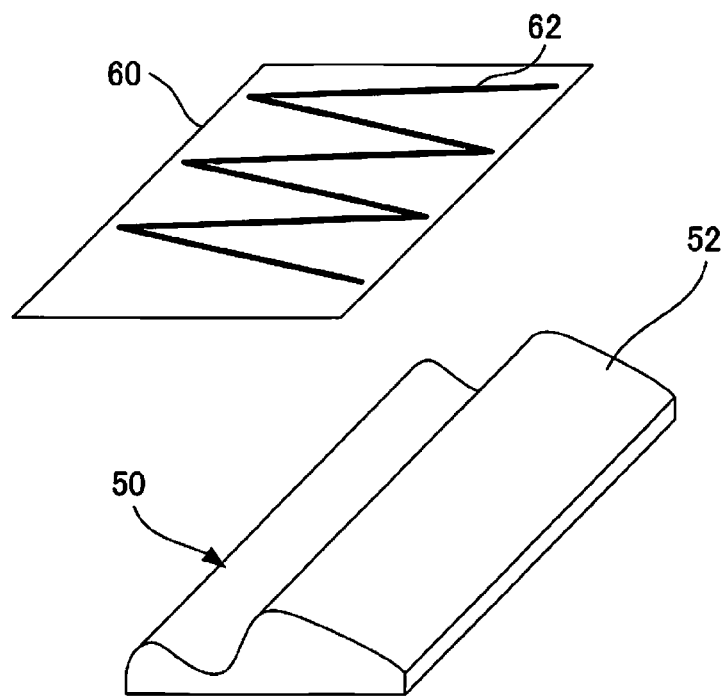
FIG. 7A illustrates processing when an operation pattern is projected onto a workpiece model.

In step S403, the operation pattern selection unit 14 selects one operation pattern from the plurality of different operation patterns stored in the operation pattern storage unit 13. In step S404, the projection target arrangement unit 15 arranges a projection target in the virtual space. FIG. 7A illustrates the workpiece model 50 and a projection target 60 arranged in a virtual space, respectively. According to the illustrated embodiment, the projection target 60 is a plane on which a V-shaped operation pattern 62 is provided. The projection target 60 may be in another form, for example, having a three-dimensional shape formed by a combination of two or more planes or a three-dimensional shape including at least one curved surface. As illustrated in FIG. 7A, the projection target 60 is arranged in a certain positional relationship relative to the workpiece model 50. Specifically, the projection target 60 is arranged in a positional relationship which allows the operation pattern 62 to be projected onto a surface 52 of the workpiece model 50.

Figure 7B:
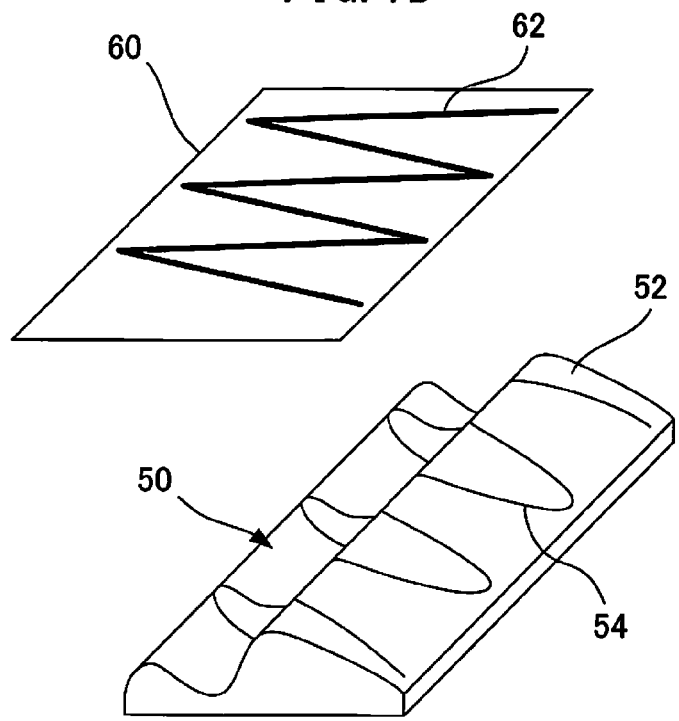
FIG. 7B illustrates processing when an operation pattern is projected onto a workpiece model.

In step S405, the machining path creation unit 16 projects the operation pattern 62 provided on the projection target 60, onto the surface 52 of the workpiece model 50, and creates a machining path 54 on the surface 52 of the workpiece model 50 as illustrated in FIG. 7B.

In step S406, the position and the posture of the tool 140 which moves along the machining path 54 are determined based on the machining path 54 acquired in step S405 and a predetermined positional relationship between the workpiece 150 and the tool 140. The posture of the tool 140 is determined such that the tool 40 is oriented at a predetermined angle relative to the workpiece 150, for example, at a right angle to a tangential plane of the workpiece 150.

Figure 8:
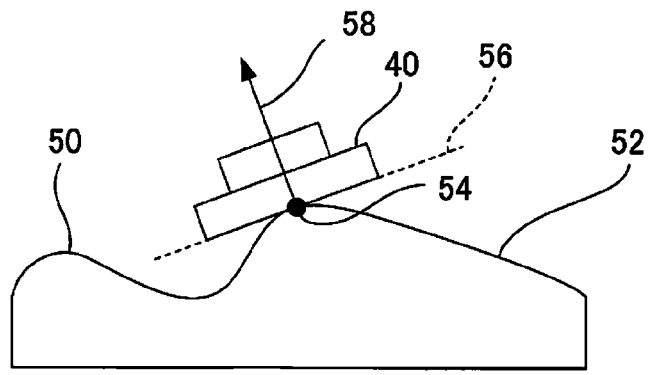
FIG. 8 illustrates a process for determining a position or a posture of a tool.

Referring to FIG. 8, a normal line 58 to a tangential plane 56 of the workpiece model 50 extending through the machining path 54 is illustrated. According to one embodiment, the position and the posture of the tool 140 is determined so that a posture of the tool model 40 matches with the normal line 58. Accordingly, a robot program for controlling the robot 130 to execute certain machining is created by the robot programming apparatus 10.

When the robot program created according to the above-described embodiment with reference to FIG. 4 is executed, the tool 140 may sometimes interfere with the workpiece 150. In such a case, the program needs to be corrected. According to the present embodiment, when the determination unit 18 of the robot programming apparatus 10 determines that the tool 140 and the workpiece 150 interfere with each other, the robot program is corrected by executing processes described below.

Figure 10A:
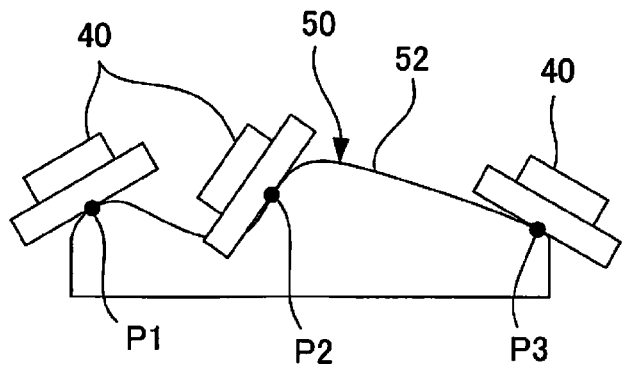
FIG. 10A illustrates a process for changing a position and a posture of a tool.

FIG. 10A illustrates the tool model 40 moves along the surface 52 of the workpiece model 50 according to a robot program. Black dots P1 to P3 represent contact points between the tool model 40 and the workpiece model 50 (i.e., machining points). As can be seen from FIG. 10A, when the tool model 40 comes in contact with the workpiece model 50 at the contact point P1 or P3, interference does not occur between the tool model 40 and the workpiece model 50. On the other hand, at the contact point P2, the tool model 40 comes in contact with the workpiece model 50 at a point other than the contact point P2, and thus there is interference therebetween.

Figure 9:
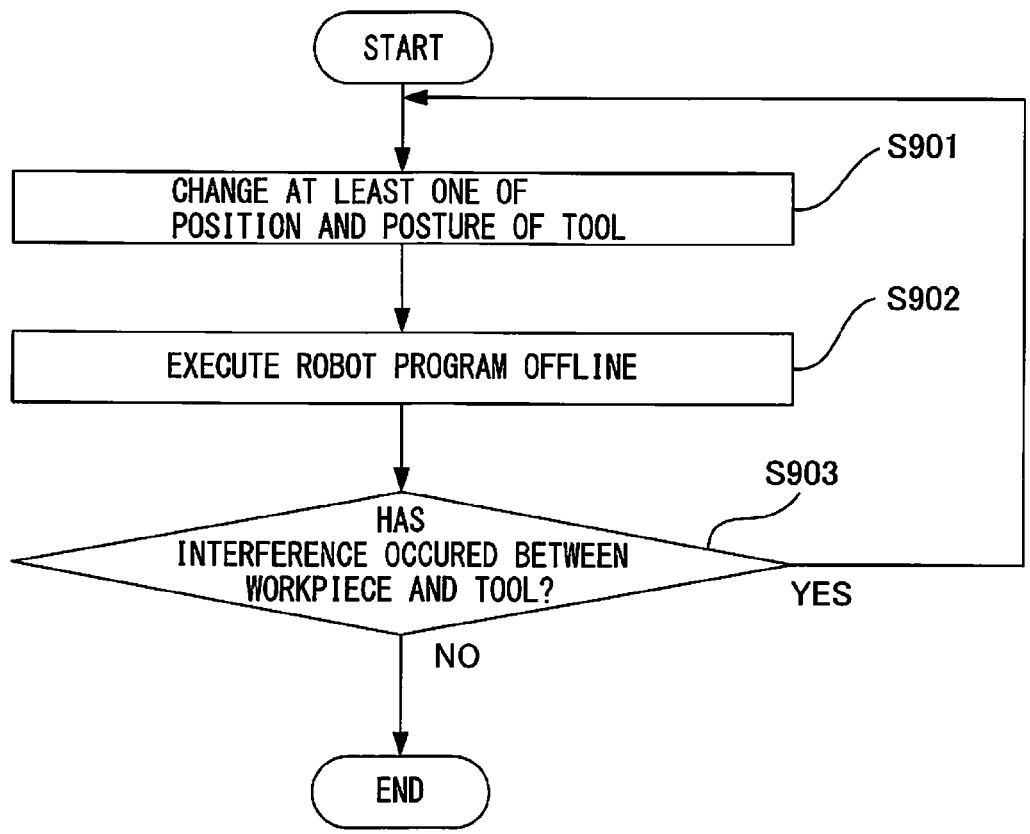
FIG. 9 is a flowchart illustrating processes for changing a position or a posture of a tool.

FIG. 9 is a flowchart illustrating processes for changing the position or the posture of the tool 140 so as not to prevent interference between the tool 140 and the workpiece 150 from occurring.

In step S901, the position and posture correction unit 19 changes at least one of the position and the posture of the tool 140. For example, the position of the tool 140 is shifted by a certain displacement amount α in an X-axis direction of a tool coordinate system defined in association with the tool 140. Specifically, a teaching point taught to the robot 130 is shifted by the displacement amount α in the X-axis direction of the tool coordinate system, so that the position of the tool 140 is changed. According to another example, a teaching posture for the wrist 132 of the robot 130 is rotated by a displacement amount β degree about the X axis of the tool coordinate system, so as to change the posture of the tool 140.

With reference to FIG. 9 again, in step S902, the robot program changed in step S901 is executed offline. In step S903, the determination unit 18 determines whether or not the tool 140 interferes with the workpiece 150. When it is determined in step S903 that interference occurs, the process returns to step S901, at which the position and posture correction unit 19 changes again at least one of the position and the posture of the tool 140. When it is determined in step S903 that interference does not occur, the correction process of the robot program is terminated.

Figure 10B:
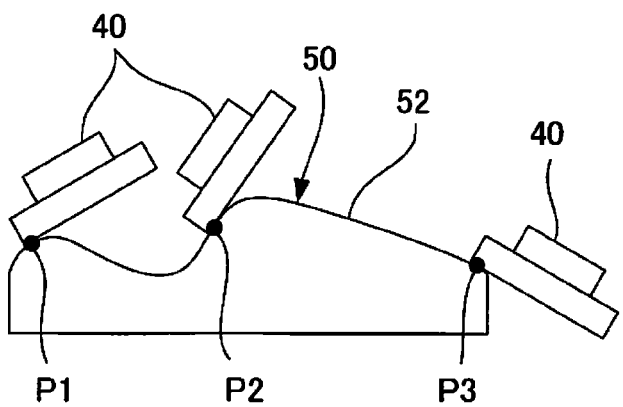
FIG. 10B illustrates a process for changing a position and a posture of a tool.

FIG. 10B illustrates an example in which the position of the tool 140 is changed by the correction process described above with reference to FIG. 9. In comparison of FIG. 10A with FIG. 10B, it can be understood that the machining point of the tool model 40 (a point at which the tool model 40 comes in contact with the workpiece model 50) is changed as a result of the corrected position of the tool 140. In addition, at each of the contact points P1 to P3, the tool model 40 and the workpiece model 50 do not contact with each other at any point, except for the machining point. In other words, according to the corrected robot program, machining process can be executed without causing interference between the tool 140 and the workpiece 150.

Figure 10C:
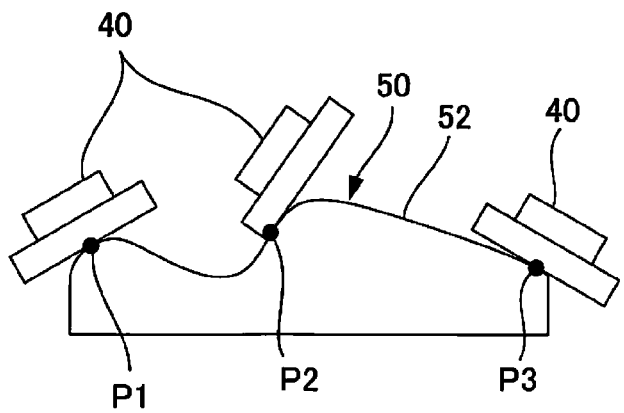
FIG. 10C illustrates a process for changing a position and a posture of a tool.

As illustrated in FIG. 10B, the position of the tool model 40 is also changed at the contact points P1 and P3 where it is determined that interference does not occur (see FIG. 10A). In other words, the position of the tool model 40 is changed in the entire machining path 54. However, according to another embodiment, the position and posture correction unit 19 may be configured to change the position (or the posture) of the tool 140 only at the point where it is determined that interference occurs, i.e., only at the contact point P2. FIG. 10C illustrates an example in which the position of the tool 140 is not corrected at the contact points P1 and P3, whereas the position of the tool 140 is corrected at the contact point P2 (i.e., only the position of the tool model 40 is changed).

According to the present embodiment, the machining path 54 is created according to the predetermined operation pattern 62 provided on the projection target 60, and the position and the posture of the tool 140 are automatically determined along the machining path 54. Further, when the workpiece 150 and the tool 140 interfere with each other, at least one of the position and the posture of the tool 140 is automatically corrected. Accordingly, the robot program which does not cause interference between the workpiece 150 and the tool 140 is automatically created, so that a teaching process for the robot 130 can be executed in a short time, and efficiency can be improved.

Figure 11:
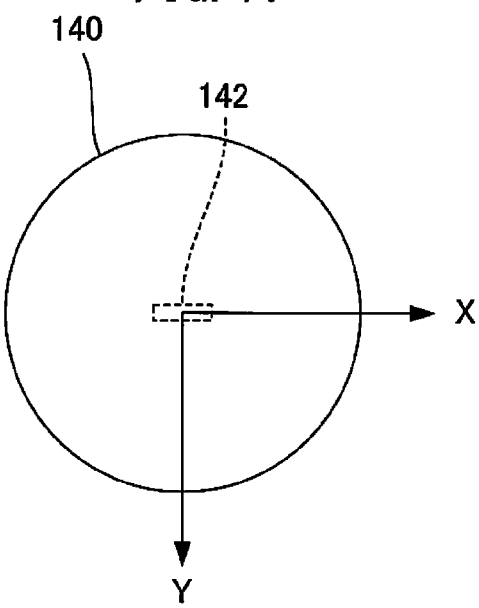
FIG. 11 illustrates a process for changing a position and a posture of a tool.
Figure 12:
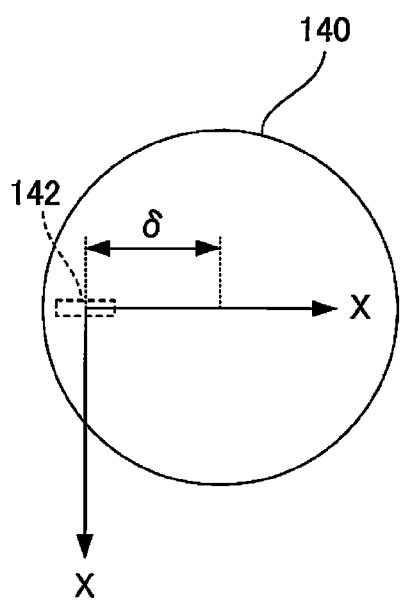
FIG. 12 illustrates a process for changing a position and a posture of a tool.

According to another embodiment, the tool coordinate system associated with the tool 140 may be corrected in order to change at least one of the position and the posture of the tool 140. For example, when the coordinate system is shifted by a displacement amount $\delta$ in the X-axis direction, the position of the tool 140 is moved by the displacement amount $\delta$. FIG. 11 and FIG. 12 illustrate the tool 140 seen from the side of a machining point 142. In a state before correction as illustrated in FIG. 11, the origin of the tool coordinate system is defined on a center axis line of the tool 140. In contrast, in a state after correction as illustrated in FIG. 12, the origin of the tool coordinate system is displaced by the displacement amount $\delta$ to a left side of the drawing. Alternatively, for example, when the coordinate system is rotated by a displacement amount $\delta'$ degree about the X axis, the posture of the tool 140 can be rotated by the displacement amount $\delta'$ degree.

Figure 13:
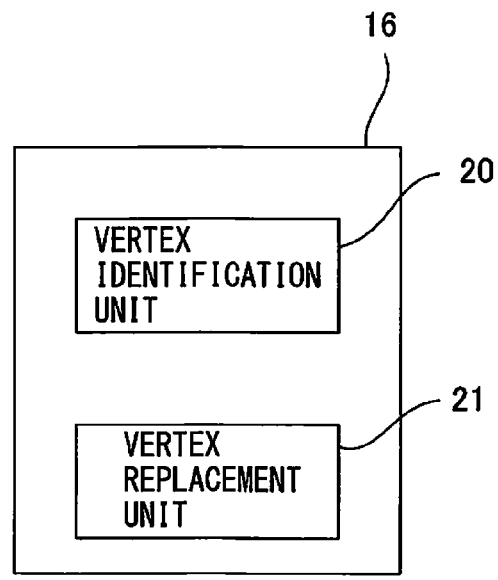
FIG. 13 is a functional block diagram of a machining path creation unit of a robot programming apparatus according to a variant.

FIG. 13 illustrates a modification of the above-described embodiment. According to the present modification, the machining path creation unit 16 further includes a vertex identification unit 20 and a vertex replacement unit 21.

The vertex identification unit 20 has a function of identifying a vertex of the operation pattern 62 which is not projected onto the workpiece model 50 when the operation pattern 62 is projected onto the workpiece model 50.

Figure 14:
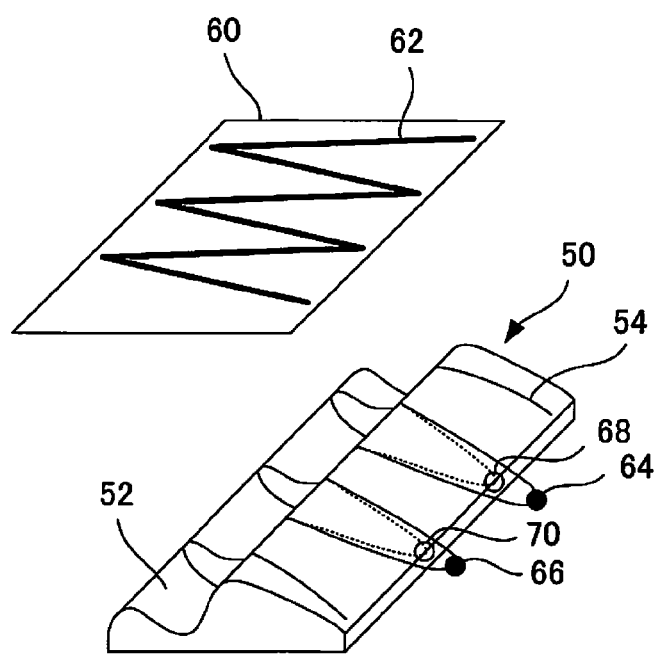
FIG. 14 illustrates a process for creating a machining path according to the variant.

The vertex replacement unit 21 has a function of replacing the vertex of the operation pattern 62 identified by the vertex identification unit 20 with a point which is on the surface 52 of the workpiece model 50 and closest to the vertex identified. For example, as illustrated in FIG. 14, when vertices 64 and 66 (indicated by black dots) of the operation pattern 62 are situated outside of a range of the workpiece model 50, the machining path 54 is formed using points 68 and 70 (indicated by white dots), which are on the surface 52 of the workpiece model 50 and closest to the vertices 64 and 66, respectively.

According to the present modification, the machining path creation unit 16 creates the machining path 54 based on the points replaced by the vertex replacement unit 21, as necessary. Since the process of creating the machining path 54 is automated, and the teaching process can be efficiently executed.

Figure 15:
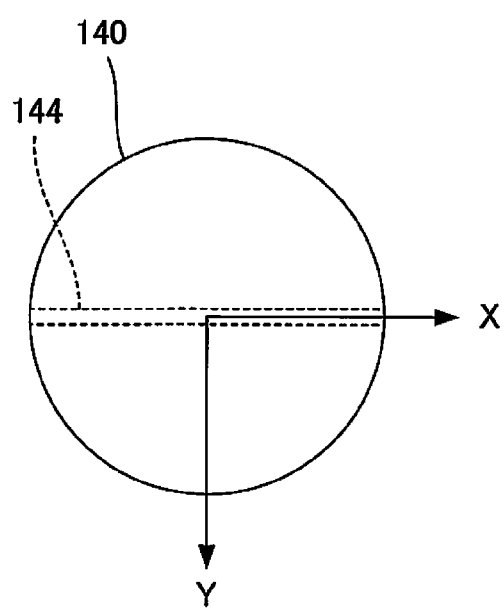
FIG. 15 illustrates an example of a machining point defined with respect to a tool.

According to one embodiment, the machining point of the tool 140 may be determined in advance. According to this embodiment, the position and posture determination unit 17 determines the position and the posture of the tool 140 so that, for example, a machining point is set within a range 144 which is defined on a straight line perpendicularly intersecting the center axis line of the tool 140, as illustrated in FIG. 15. In addition, the position and posture correction unit 19 is configured to correct the position and the posture of the tool 140 so that the corrected machining point of the tool 140 is within the above-described range 144.

According to the embodiment described above with reference to FIG. 15, machining of the workpiece 150 is executed at an appropriate machining point of the tool 140. This prevents the machining of the workpiece 150 from being executed at an unintended machining point.

EFFECT OF THE INVENTION

The robot programming apparatus according to the present invention automatically determines whether or not a tool which moves along a machining path created by projecting an operation pattern onto a workpiece model in a virtual space interferes with a workpiece. When it is determined that interference occurs, at least one of the position and the posture of the tool is changed to correct the robot program, and thus interference is prevented. Accordingly, a teaching process for a robot can be executed in a short time, and efficiency can be improved.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. A robot programming apparatus configured to create a robot program for operating a robot equipped with a tool to execute machining of a workpiece arranged in a work space, the robot programming apparatus comprising:

a virtual space creation unit configured to create a virtual space which three-dimensionally represent the work space;

a model arrangement unit configured to arrange a workpiece model, a robot model, and a tool model which three-dimensionally represent the workpiece, the robot, and the tool in the virtual space, respectively;

a projection target arrangement unit configured to arrange in the virtual space a projection target on which an operation pattern of the tool for machining the workpiece is provided;

a machining path creation unit configured to project the operation pattern onto at least one surface, which is curved in a direction of a center axis line of the tool, of the workpiece model and create a machining path through which a machining point of the tool passes for machining the workpiece;

a position and posture determination unit configured to determine a position and a posture of the tool for machining the workpiece along the machining path based on a direction of a normal line to the at least one surface of the workpiece model and on the machining path;

a determination unit configured to determine whether or not the workpiece and the tool interfere with each other at any point along the machining path except for the machining point of the tool, based on the position and the posture of the tool determined by the position and posture determination unit; and a position and posture correction unit configured to, when the determination unit determines that interference occurs at a point along the machining path other than the machining point, correct at least one of the position and the posture of the tool at the point where it is determined that the interference occurs without changing the machining point so that the workpiece and the tool do not interfere with each other at any point, including an inflection point, along the machining path except for the machining point of the tool, wherein the position and posture correction unit is configured to change at least one of the position and the posture of the tool by changing a coordinate system defined in association with the tool.

2. The robot programming apparatus according to claim 1, wherein the machining point of the tool is set in advance.

3. The robot programming apparatus according to claim 1, wherein the operation pattern includes a vertex, and
wherein the machining path creation unit further comprises:
a vertex identification unit configured to, when the operation pattern is projected onto the at least one surface of the workpiece model, identify the vertex of the operation pattern which is not project onto the at least one surface; and
a vertex replacement unit configured to replace the vertex of the operation pattern identified by the vertex identification unit with a point which is on the at least one surface of the workpiece model and closest to the vertex.

4. The robot programming apparatus according to claim 1, further comprising:
an operation pattern storage unit configured to store a plurality of different operation patterns of the tool for machining the workpiece; and
an operation pattern selection unit configured to select an operation pattern provided on the projection target from the plurality of different operation patterns.

5. The robot programming apparatus according to claim 1, wherein the position and posture correction unit is further configured to change the position or the posture of the tool only at the point where it is determined that the interference occurs.

6. The robot programming apparatus according to claim 1, wherein
the machining point of the tool is determined in advance of machining of the workpiece, and
the machining point is set within a range which is defined on a straight line perpendicularly intersecting the center axis line of the tool.

7. A robot programming apparatus configured to create a robot program for operating a robot equipped with a tool to execute machining of a workpiece arranged in a work space, the robot programming apparatus comprising:
a virtual space creation unit configured to create a virtual space which three-dimensionally represent the work space;

a model arrangement unit configured to arrange a workpiece model, a robot model, and a tool model which three-dimensionally represent the workpiece, the robot, and the tool in the virtual space, respectively;

a projection target arrangement unit configured to arrange in the virtual space a projection target on which an operation pattern of the tool for machining the workpiece is provided;

a machining path creation unit configured to project the operation pattern onto at least one surface, which is curved in a direction of a center axis line of the tool, of the workpiece model and create a machining path through which a machining point of the tool passes for machining the workpiece;

a position and posture determination unit configured to determine a position and a posture of the tool for machining the workpiece along the machining path based on a direction of a normal line to the at least one surface of the workpiece model and on the machining path;

a determination unit configured to determine whether or not the workpiece and the tool interfere with each other at any point, except for the machining point of the tool, based on the position and the posture of the tool determined by the position and posture determination unit; and a position and posture correction unit configured to, when the determination unit determines that interference occurs, correct at least one of the position and the posture of the tool so that the workpiece and the tool do not interfere with each other at any point, including an inflection point, along the machining path except for the machining point of the tool, wherein the position and posture correction unit is configured to change at least one of the position and the posture of the tool by changing a coordinate system defined in association with the tool, wherein
the position of the tool is shifted by a certain displacement amount in an X-axis direction of the coordinate system defined in association with the tool.

8. The robot programming apparatus according to claim 7, wherein
a teaching point taught to the robot is shifted by the certain displacement amount in the X-axis direction of the coordinate system, and the position of the tool is changed.

9. A robot programming apparatus configured to create a robot program for operating a robot equipped with a tool to execute machining of a workpiece arranged in a work space, the robot programming apparatus comprising:
a virtual space creation unit configured to create a virtual space which three-dimensionally represent the work space;
a model arrangement unit configured to arrange a workpiece model, a robot model, and a tool model which three-dimensionally represent the workpiece, the robot, and the tool in the virtual space, respectively;
a projection target arrangement unit configured to arrange in the virtual space a projection target on which an operation pattern of the tool for machining the workpiece is provided;
a machining path creation unit configured to project the operation pattern onto at least one surface, which is curved in a direction of a center axis line of the tool, of the workpiece model and create a machining path through which a machining point of the tool passes for machining the workpiece;

a position and posture determination unit configured to determine a position and a posture of the tool for machining the workpiece along the machining path based on a direction of a normal line to the at least one surface of the workpiece model and on the machining path;

a determination unit configured to determine whether or not the workpiece and the tool interfere with each other at any point, except for the machining point of the tool, based on the position and the posture of the tool determined by the position and posture determination unit; and a position and posture correction unit configured to, when the determination unit determines that interference occurs, correct at least one of the position and the posture of the tool so that the workpiece and the tool do not interfere with each other at any point, including an inflection point, along the machining path except for the machining point of the tool, wherein the position and posture correction unit is configured to change at least one of the position and the posture of the tool by changing a coordinate system defined in association with the tool, wherein a teaching posture for a wrist of the robot is rotated by a certain displacement angle about the X axis of the coordinate system, and the posture of the tool is changed.

\* \* \* \* \*